(12) United States Patent
Melikyan et al.

(10) Patent No.: US 12,181,709 B2
(45) Date of Patent: Dec. 31, 2024

(54) TRIMMING OF OPTICAL RESPONSE FOR TUNABLE PHOTONIC DEVICES

(71) Applicant: II-VI Delaware, Inc., Wilmington, DE (US)

(72) Inventors: Argishti Melikyan, Marlboro, NJ (US); Po Dong, Morganville, NJ (US)

(73) Assignee: II-VI DELAWARE, INC., Wilmington, DE (US)

( * ) Notice: Subject to any disclaimer, the term of this patent is extended or adjusted under 35 U.S.C. 154(b) by 310 days.

(21) Appl. No.: 17/654,282

(22) Filed: Mar. 10, 2022

(65) Prior Publication Data

US 2023/0288635 A1    Sep. 14, 2023

(51) Int. Cl.
*G02B 6/12* (2006.01)
*G02B 6/13* (2006.01)
*G02B 6/293* (2006.01)

(52) U.S. Cl.
CPC ..... *G02B 6/12007* (2013.01); *G02B 6/12004* (2013.01); *G02B 6/13* (2013.01); *G02B 6/29343* (2013.01); *G02B 6/29346* (2013.01); *G02B 6/29395* (2013.01)

(58) Field of Classification Search
CPC .. G02B 6/12007; G02B 6/12004; G02B 6/13; G02B 6/29343; G02B 6/29346; G02B 6/29395
USPC .......................................................... 385/14
See application file for complete search history.

(56) References Cited

U.S. PATENT DOCUMENTS

| 7,259,031 | B1 | 8/2007 | Dickinson et al. |
| 11,048,041 | B2 | 6/2021 | Ravi et al. |
| 2007/0222339 | A1* | 9/2007 | Lukacs ................. B06B 1/0622 310/334 |
| 2022/0065798 | A1 | 3/2022 | Norberg et al. |

FOREIGN PATENT DOCUMENTS

CN          1802745 A  *  7/2006  ......... H01L 23/5222

OTHER PUBLICATIONS

Du et al., "Mechanically-Tunable Photonic Devices with On-Chip Integrated MEMS/NEMS Actuators," Apr. 16, 2016, Micromachines, pp. 1-24. (Year: 2016).*

(Continued)

*Primary Examiner* — Jerry M Blevins
(74) *Attorney, Agent, or Firm* — Blank Rome LLP

(57) ABSTRACT

An optoelectronic circuit used with signal light comprises photonic devices disposed on a platform. The photonic devices are configured to condition the signal light and are fabricated with an optical characteristic being electronically tunable. A fabricated performance of the optical characteristic can be varied from a target performance due to a difference (e.g., alteration, change, error, or discrepancy) in the process used to fabricate the device. A ground bus, a power bus, and banks of electronic components are disposed on the platform in electrical communication with the photonic devices. The electronic components in a given bank are selectively configurable to tune the optical characteristic of the associated device so a variance can be diminished between the fabrication and target performances of the device's optical characteristic due to the difference in the fabrication process.

13 Claims, 10 Drawing Sheets

(56) References Cited

OTHER PUBLICATIONS

Cohen et al., "Improving the Tolerances in High-Performance Silicon Photonics Modulators," Feb. 7, 2022, Tel Aviv University, vol. 1, No. 4, p. 934. (Year: 2022).*
Stampoulidis et al. "Hybrid Photonic Integrated Circuits for Faster and Greener Optical Communication Networks," Feb. 10, 2011, Integrated Optics: Devices, Materials, and Technologies XV, vol. 7941, No. 1, pp. 1-7. (Year: 2011).*
Chen, Shuhuang, et al., "High-Lineartiy Fano Resonance Modulator Using a Microring-Assisted Mach-Zehnder Structure", Journal of Lightwave Technology, 2020, 38:13:3395-3403 (XP011798661).
Cohen, Roei Aviram, et al., "Improving the Tolerances in High-Performance Silicon Photonics Modulators", Optics Continuum, 2022, 1:4:934-948 (XP093059959).
Du, Han, et al., "Mechanically-Tunable Photonic Devices With On-Chop Integrated MEM/NEMS Acutators", Micromachines, 2016, 7:69:1-24 (XP055497852).
Mizumoto, T, et al., "On-Chip Optical Isolators and Silicon Photonics", Opto-Electronics and Communications Conference (OECC 2012) Technical Digest, 2012, 877-878 (XP032223234).
Stampoulidis, L, et al., "Hybrid Photonic Integrated Circuits for Faster and Greener Optical Communication Networks", Integrated Optics: Devices, Materials, and Technologies XV, 2011, 7941:1-7 (XP060020582).
Yen, Tzu-Hsiang, et al., "Fabrication-Tolerant CWDM (de)Multiplexer Based on Cascaded Mach-Zehnder Interferometers on Silicon-on-Insulator", Journal of Lightwave Technology, 2021, 39:1:146-153 (XP011826203).

* cited by examiner

TRIMMING OF OPTICAL RESPONSE FOR TUNABLE PHOTONIC DEVICES

BACKGROUND OF THE DISCLOSURE

Many photonic devices, such as optical filters, micro-ring devices, Mach-Zehnder interferometers, and the like, require accurate optical phase adjustments to operate properly. Other photonic devices may also require other optical adjustments to be accurately made for proper operation.

Although the response of a photonic device can be controlled during operation by actively monitoring and adjusting the photonic device using digital or analog control loops, engineers would prefer to set the required optical adjustments during the fabrication process of the photonic devices. However, attempts to control the optical phase or other optical characteristics in the design and fabrication process of the photonic devices can be extremely difficult due to the short optical wavelengths used for these photonic devices.

The subject matter of the present disclosure is directed to overcoming, or at least reducing the effects of, one or more of the problems set forth above.

SUMMARY OF THE DISCLOSURE

An optoelectronic circuit disclosed herein is used with signal light and with constant supply power. The optoelectronic circuit comprises one or more tunable photonic devices, at least one ground bus, at least one power bus, and one or more sets of electronic components. Each of these elements is disposed on a platform, such as a photonic integrated circuit, a substrate, a die, or a chip.

The one or more tunable photonic devices are configured to condition the signal light. Each tunable photonic device is fabricated with at least one optical characteristic being electronically tunable. A fabricated performance of the at least one optical characteristic for each tunable photonic device is variable at a variance from a target performance of the at least one optical characteristic due to a difference (e.g., alteration, change, error, or discrepancy) in fabrication tolerance.

The at least one ground bus and the at least one power bus disposed on the platform are configured to connect to the constant supply power, and one or more sets of electronic components are each disposed in electrical communication with an associated one of the one or more tunable photonic devices between the at least one ground bus and the at least one power bus. The electronic components in each set are selectively configurable to tune the at least one optical characteristic of the associated tunable photonic device. Each set is independently configurable to diminish the variance between the target and fabrication performances of the at least one optical characteristic for the associated tunable photonic device.

The optoelectronic circuit can comprise a plurality of the one or more tunable photonic devices disposed on the platform and can comprise a plurality of the one or more sets of electronic components disposed on the platform. Each set is associated with one of the tunable photonic devices. For each tunable photonic device, the set of the electrical components is independently configurable to diminish the variance between the target and fabrication performances of the device's at least one optical characteristic. Additionally, each set is independently configurable to diminish the variance due to the difference in the fabrication tolerances between two or more of the tunable photonic devices.

An optoelectronic circuit disclosed herein is used with signal light and with constant supply power. The optoelectronic circuit comprises one or more tunable photonic devices, at least one ground bus, at least one power bus, and one or more sets of electronic components. Each of these elements is disposed on a platform, such as a photonic integrated circuit, a substrate, a die, or a chip.

The one or more tunable photonic devices are configured to condition the signal light. Each tunable photonic device has at least one optical characteristic, which is electronically tunable to a target performance. The at least one ground bus and the at least one power bus are configured to connect to the constant supply power. Each set of the electronic components is disposed in electrical communication with an associated one of the one or more tunable photonic devices between the at least one ground bus and the at least one power bus. The electronic components in each set are selectively configurable to adjust the at least one optical characteristic of the associated tunable photonic device, and each set is independently configurable to tune the at least one optical characteristic for the associated tunable photonic device to the target performance.

A method is disclosed herein to fabricate an optoelectronic circuit used with signal light and with constant supply power. The method comprises: forming one or more tunable photonic devices on a platform by fabricating each tunable photonic device with at least one optical characteristic being electronically tunable to condition the signal light, a fabricated performance of the at least one optical characteristic for each tunable photonic device being variable at a variance from a target performance of the at least one optical characteristic due to a difference in fabrication tolerance; forming at least one ground bus and at least one power bus on the platform configured to be connected to the constant supply power; forming one or more sets of electronic components on the platform each in electrical communication with an associated one of the one or more tunable photonic devices between the at least ground bus and the at least one power bus; and independently tuning the at least one optical characteristic of at least one of the one or more tunable photonic devices by selectively configuring the electronic components in the set associated with the at least one tunable photonic device and diminishing the variance between the target and fabricated performances of the at least one optical characteristic for the at least one tunable photonic device.

The foregoing summary is not intended to summarize each potential embodiment or every aspect of the present disclosure.

DETAILED DESCRIPTION OF THE DISCLOSURE

Figure 1A:
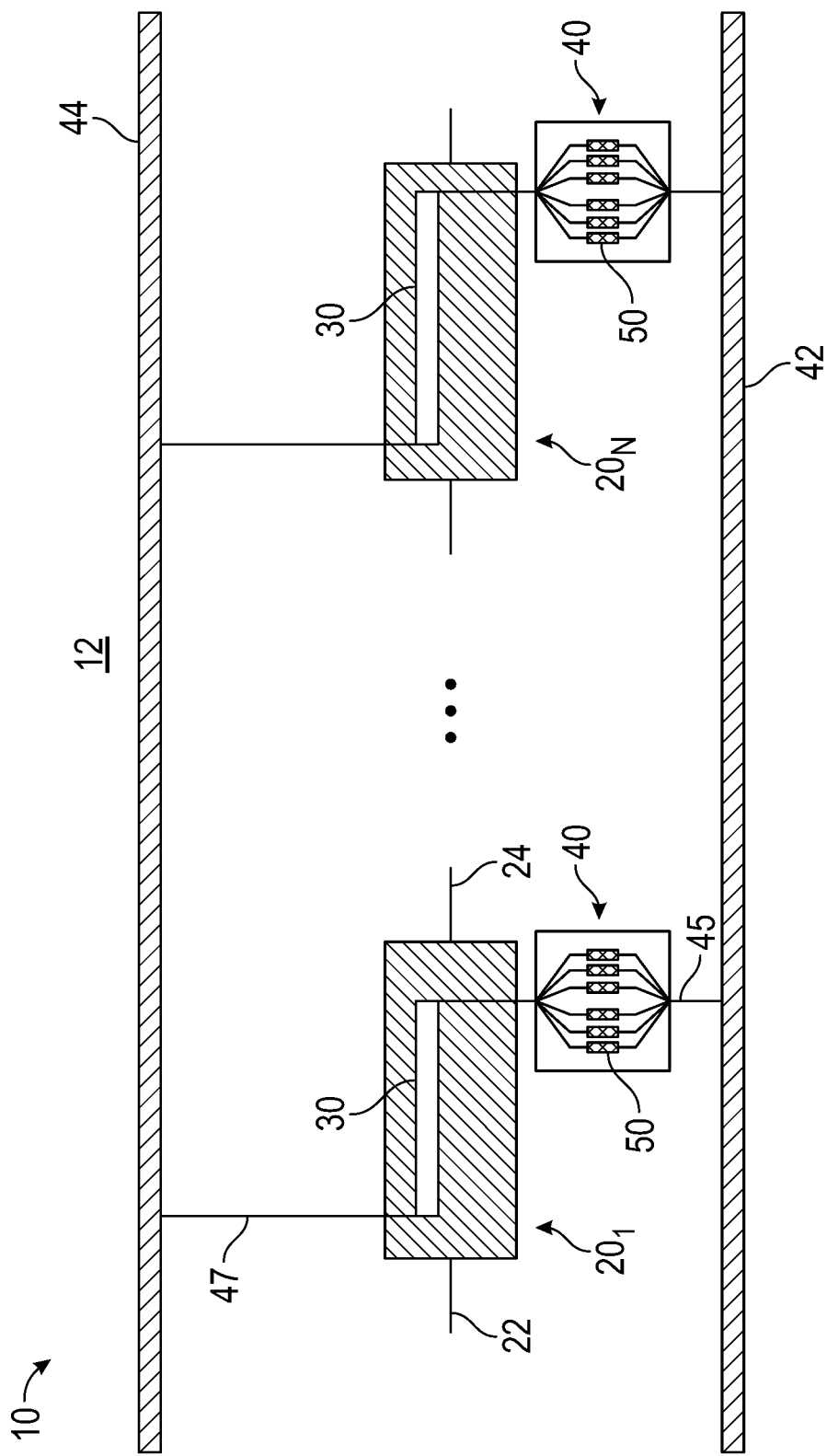
FIG. 1A illustrates a schematic view of an optoelectronic circuit according to the present disclosure having tunable photonic devices and trimming banks implemented in a common platform.

FIG. 1A illustrates a schematic view of an optoelectronic circuit 10 according to the present disclosure. The circuit 10 can be fabricated in an appropriate form as part of a common platform 12, such as a photonic integrated circuit, substrate, die, chip, etc. The circuit 10 can process or perform functions on signal light, for example, by conditioning (modifying, phase shifting, filtering, modulating, etc.) the signal light routed in the circuit 10. As will be appreciated, the signal light can be optical signals having typical wavelengths used in optical communications.

The circuit 10 includes a plurality of tunable photonic devices 20 (1 to N) each having an input 22 and/or an output 24 for optical signals. Each tunable photonic device 20 has an electronically tunable element 30 providing a response that is voltage or current sensitive. Each electronically tunable element 30 is connected to a ground bus 42 and a power bus 44 by a trimming bank 40 for selectively tuning the element 30 during fabrication.

The response of the electronically tunable element 30 is trimmed using the trimming bank 40 connected in series to the photonic device 20 between the buses 42, 44. In turn, the conditioning (modifying, phase shifting, filtering, modulating, etc.) of the signal light performed by the tunable photonic device 20 is tuned by the trimmed response of the element 30.

For example, the trimming bank 40 includes a set or an array of electronic components 50 connected in series, parallel, or both to one another between the electronically tunable element 30 and a ground connection or trace 45 to the ground bus 42. The electronically tunable element 30, in turn, connects to the power bus 44 by a power connection or trace 47.

In general, the circuit 10 can be used for a delay interferometer-based filter, a 90-degree hybrid, a micro-ring modulator array, and the like. The tunable photonic devices 20 can include an optical filter, a thermo-optic phase shifter, a micro-ring device (e.g., ring resonator or modulator), a multiplexer/demultiplexer filter (e.g., Coarse Wavelength Division Multiplexing (CWDM) filter), a tunable reflector, a thermo-optic switch, a thermo-optic modulator, electro-optic modulator, a variable optical attenuator, a Mach-Zehnder interferometer (MZI), a Mach-Zehnder modulator (MZM) array, an electro-absorption modulator, or the like.

The electronically tunable element 30 can include a resistive heater (resistor) or other electronic structure responsive to a voltage or current differential between the ground bus 42 and the power bus 44. Accordingly, the tuning elements 30 can provide a thermo-optic, electro-optic, magneto-optic, or another mechanism on the tunable photonic device 20 that controls the conditioning (modifying, phase shifting, filtering, modulating, etc.) of the signal light provided by the tunable photonic device 20.

Figure 1B:
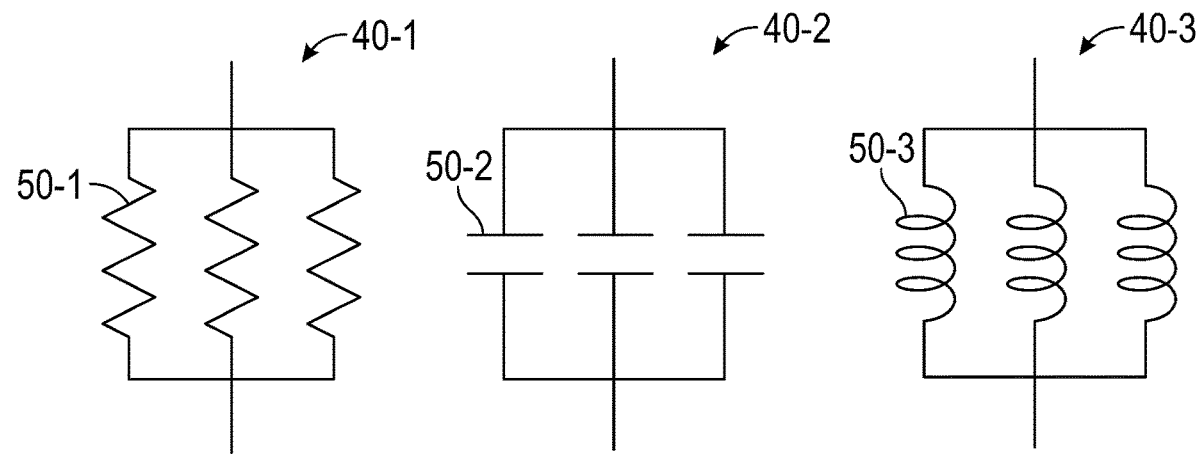
FIG. 1B illustrates simple schematic views of trimming banks with different types of electronic components.

In general, the electronic components 50 can include resistors, capacitors, inductors, or other circuitry to modify current, voltage, or other electronic characteristics. For example, FIG. 1B illustrates simple schematic views of trimming banks 40 with electronic components 50. A first trimming bank 40-1 is shown having resistors 50-1 arranged in parallel, although a serial arrangement can be used. A second trimming bank 40-2 is shown having capacitors 50-2 arranged in parallel, although a serial arrangement can be used. A third trimming bank 40-3 is shown having inductors 50-3 arranged in parallel, although a serial arrangement can be used. Combinations of these and other electronic components can be used together in parallel and series for the trimming banks of the present disclosure depending on the implementation.

Each of the tunable photonic devices 20 in FIG. 1A can be used as an independent component in a final optical assembly, or sets of the tunable photonic devices 20 may be grouped for different optical devices in a final optical assembly. For example, each of the tunable photonic devices 20 can include one or both an optical input 22 and an optical output 24, which can be waveguides. The input and outputs 22 and 24 can be connected between other tunable photonic devices 20 in the circuit 10 for interacting with signal light between devices 20. Alternatively, any of the input and/or outputs 22, 24 of a given tunable photonic device 20 may communicate with separate signal light in a final optical assembly.

Each of the tunable photonic devices 20 is fabricated on the same platform 12 (e.g., photonic integrated circuit, substrate, die, etc.), which is only generally labeled in FIG. 1A. Each of the tunable photonic devices 20 has at least one optical characteristic that is electronically tunable with the electronically tunable element 30 associated with the device 20. The optical characteristic can include optical response, phase shift, modulation, filtering, etc., such as any optical characteristics associated with the tunable photonic devices 20, including an optical filter, a thermo-optic phase shifter, a micro-ring device (e.g., ring resonator or modulator), a multiplexer/demultiplexer filter (e.g., Coarse Wavelength Division Multiplexing (CWDM) filter), a tunable reflector, a thermo-optic switch, a thermo-optic modulator, electro-optic modulator, a variable optical attenuator, a Mach-Zehnder interferometer (MZI), a Mach-Zehnder modulator (MZM) array, an electro-absorption modulator, or the like.

The at least one optical characteristic for a given device 20 is designed to have a target performance. However, during manufacture of the given device 20, a fabrication tolerance (e.g., the materials, dimensions, doping, fabrication steps, and other variables used during the fabrication process) can vary or differ for the given device 20. For example, alterations, discrepancies, or the like can occur in the fabrication tolerances during the fabrication process so that the given device 20 has a fabricated performance for the at least one optical characteristic. The fabricated performance for the at least one optical characteristic of the given device 20 can be measured after fabrication and compared to a target performance for which the given device 20 is designed. From the comparison, the fabricated performance may differ or may be varied at a variance from the target performance due to a difference in the fabrication tolerance used in fabricating the circuit 10. The difference can be an alteration, a change, an error, a discrepancy, or the like for a fabrication tolerance used in fabricating the given device 20. To undo or compensate for the difference after fabrication of the given device 20, a trimming bank 40 of electronic components 50 can be used to tune the given device 20 to bring the fabricated performance closer to the target performance.

As shown, each electronically tunable element 30 is disposed in electrical communication with a trimming bank 40 of the electronic components 50 disposed together on the platform 12 The electronic components 50 in each bank 40 are selectively configurable to tune the electronically tunable element 30 of the associated tunable photonic device 20. Therefore, the selected configuration of one bank 40 for its associated tunable photonic device 20 can be the same as or different than the selected configuration of another bank 40 for its associated device 20 depending on the different fabrication tolerances between them. In this way, each of the banks 40 is independently configurable to diminish the variance between the fabricated and target performances of the at least one optical characteristic due to the difference in the fabrication tolerance for the given device 20.

Also, during the manufacture of the optoelectronic circuit 10, the fabrication tolerances can vary or differ from one device 20 to another. Two or more of the tunable photonic devices 20 may be designed to have the same target performance, but their fabricated performances may vary from one another due to the difference in the fabrication tolerances between them. Therefore, viewed another way, each trimming bank 40 of the electronic components 50 is independently configurable to diminish the variance in performance between the two or more of the tunable photonic devices 20.

In one implementation, for example, the tunable photonic devices 20 can be thermo-optic phase shifters. In general, the thermo-optic phase shifter 20 includes an optical waveguide and a resistive heater and produces a phase shift in signal light using a thermo-optic mechanism. Accordingly, the electronically tunable element 30 can be a resistive heater.

For this example, an optical signal (i.e., signal light) input to the input 22 of the thermo-optic phase shifter 20 can have its phase shifted by the heating of the resistive heater 30 so that the signal light from the output 24 can have a phase shift. The trimming bank 40 includes a bank of resistors 50. The response of the resistive heater 30 is tuned or trimmed using the trimming resistor bank 40 connected in series to the resistive heater 30 between the buses 42, 44, which are connected to a constant supply power during operation.

Once the optoelectronic circuit 10 is fabricated, initial testing can determine any differences in fabrication tolerances between the thermo-optic phase shifters 20 and their desired optical response while their resistive heaters 30 are under constant supply power and while the resistor banks 40 are set at a default resistance. This initial testing will show that the fabricated performance differs or varies at some variance from the target performance. This testing will indicate which of the resistor banks 40 needs to be selectively adjusted to trim the resistive heaters 30 for the respective thermo-optic phase shifters 20. In this way, the phase response for a given one of the thermo-optic phase shifters 20 can be trimmed so that its fabricated performance is closed to its target performance. Additionally, the phase response for the given shifter 20 can be trimmed to match that of another one of the thermo-optic phase shifters 20 should they require the same performance and should there be a difference in their fabrication tolerances. When the optoelectronic circuit 10 is then used in an implementation and is provided with the constant supply power, the phase responses for the thermo-optic phase shifters 20 can be controlled with the pre-configuration achieved by the techniques disclosed herein.

As discussed in different arrangements below, the total resistance of a given resistor bank 40 can be trimmed by burning fuses of some of the resistors 50 in the bank 40. Both the resistors 50 and the fuses can be designed and fabricated in a silicon photonic integrated circuit 12. In this way, the resistor banks 40, the array of photonic devices 20, the power bus 44, and the ground bus 42 can all be fabricated together on the common platform 12, such as a silicon photonic integrated circuit.

Figure 1C:
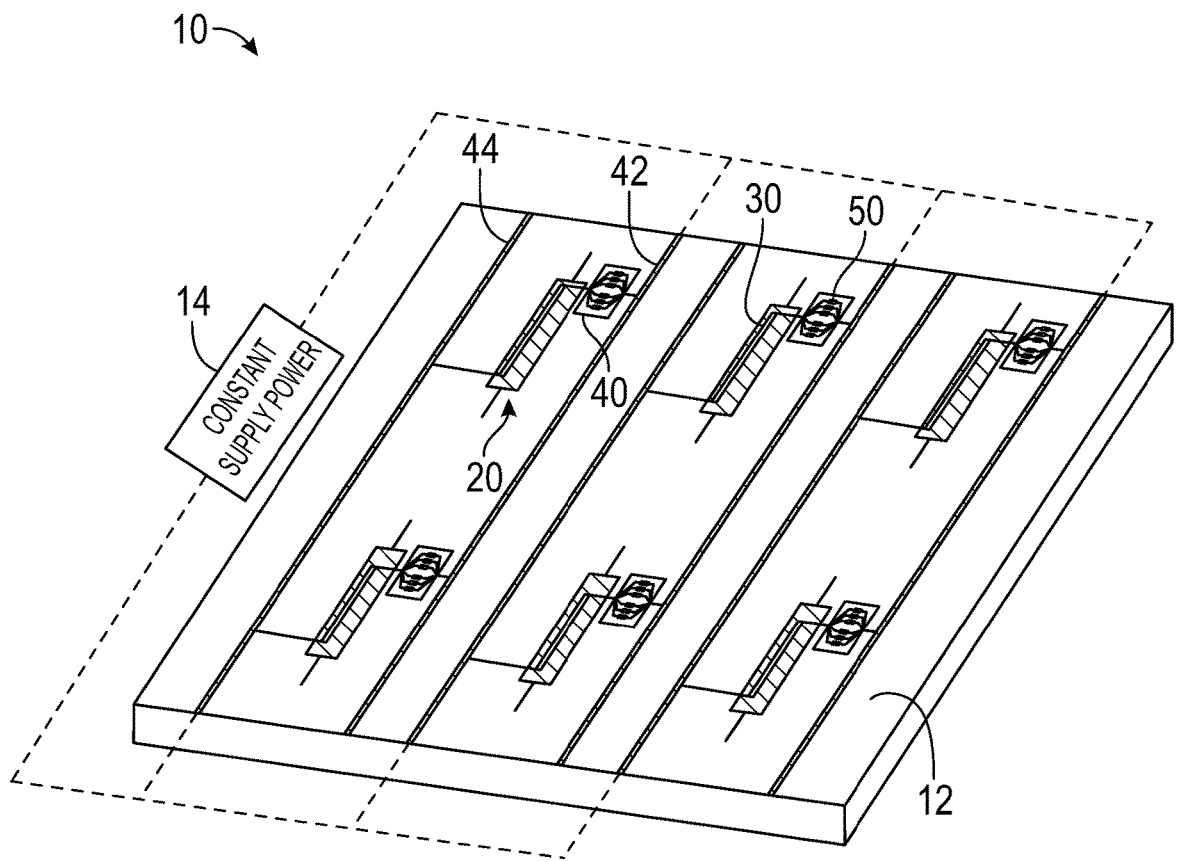
FIG. 1C illustrates a schematic view of an optoelectronic circuit implemented on a common platform and connected to constant supply power.

As an example of an optoelectronic circuit 10 of the present disclosure, FIG. 1C illustrates a schematic view of an optoelectronic circuit 10 implemented on a common platform 12. The photonic devices 20, trimming banks 40, electronic components 50, the buses 42 and 44, and the like of the circuit 10 are manufactured/fabricated in, on, or into the common platform 12 as the case may be. The buses 42, 44 of the circuit 10 are connected to a constant supply power 14.

As can be seen in the present disclosure, the trimming banks 40 having trimming resistors or other electronic components 50, which can be set during the fabrication of the optoelectronic circuit 10, allow desirable optical responses to be obtained for the entire optoelectronic circuit 10 while the constant supply power 14 is applied. The optoelectronic circuit 10 of the present disclosure allows for one-time trimming of the responses of photonic devices 20 in the circuit 10. To do this, the electrical circuitry of the trimming bank 40 connected in series or parallel to the photonic devices 20 can be trimmed such that the responses of the photonic devices 20 for the constant supply power 14 can be set as desired.

In many instances, the responses of the photonic devices 20 do not need to be actively controlled after achieving the desired responses through initial trimming adjustments disclosed herein. In other words, many optoelectronic circuits 10 that need two paths to be optically matched (e.g., optically phased matched) with one another already have either roughly the same optical delays or materials with relatively low thermo-optic coefficients, such as silicon nitride or silicon dioxide. Moreover, the design of the photonic devices 20, such as a photonic filter, can be made athermal or can be made insensitive to its fabrication as long as an initial phase or other optical adjustment is achieved using the configurations disclosed herein.

Figure 2:
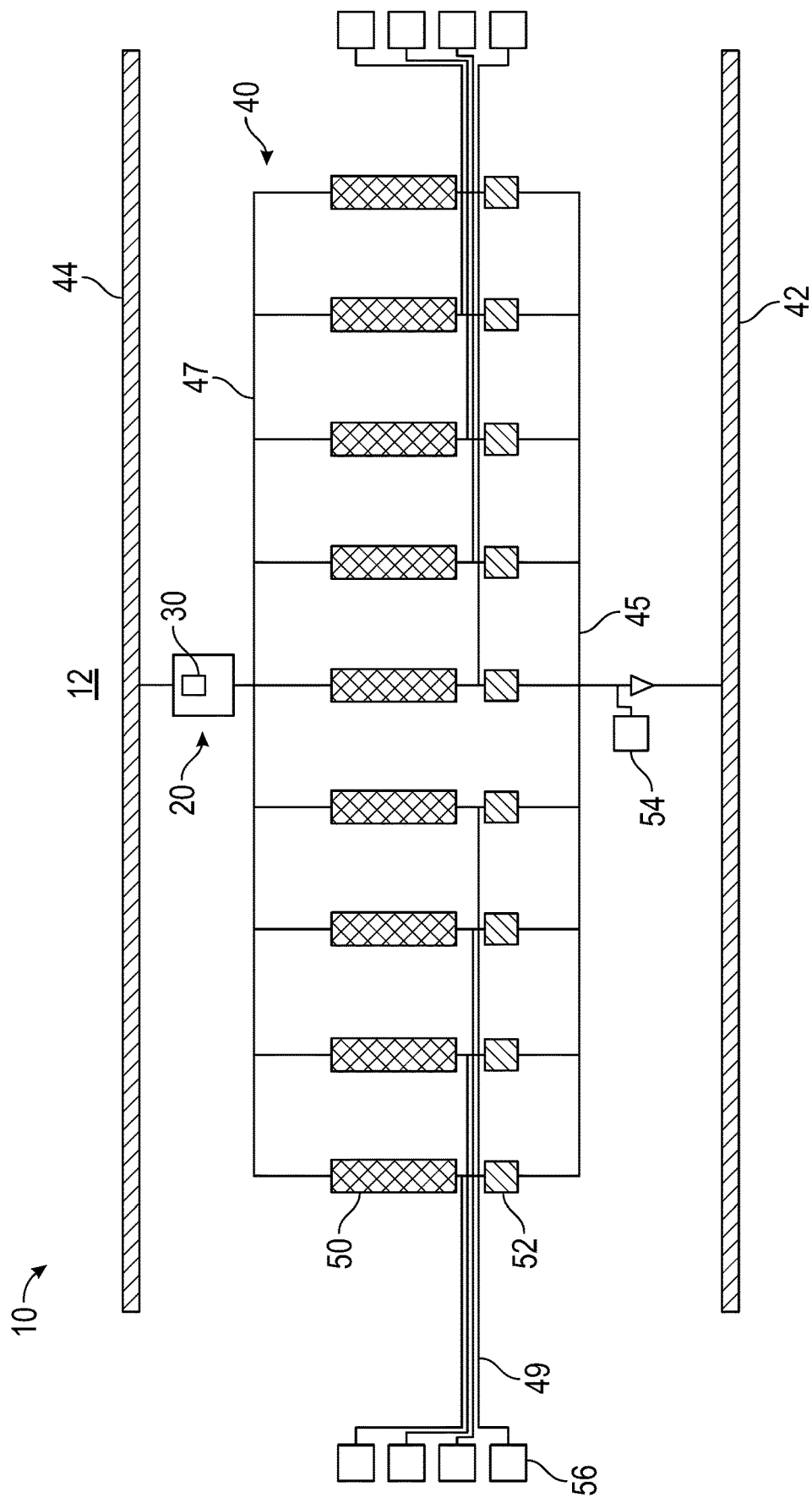
FIG. 2 illustrates a portion of an optoelectronic circuit having a tunable photonic device and a first embodiment of a trimming bank to configure trimming during fabrication.
Figure 3:
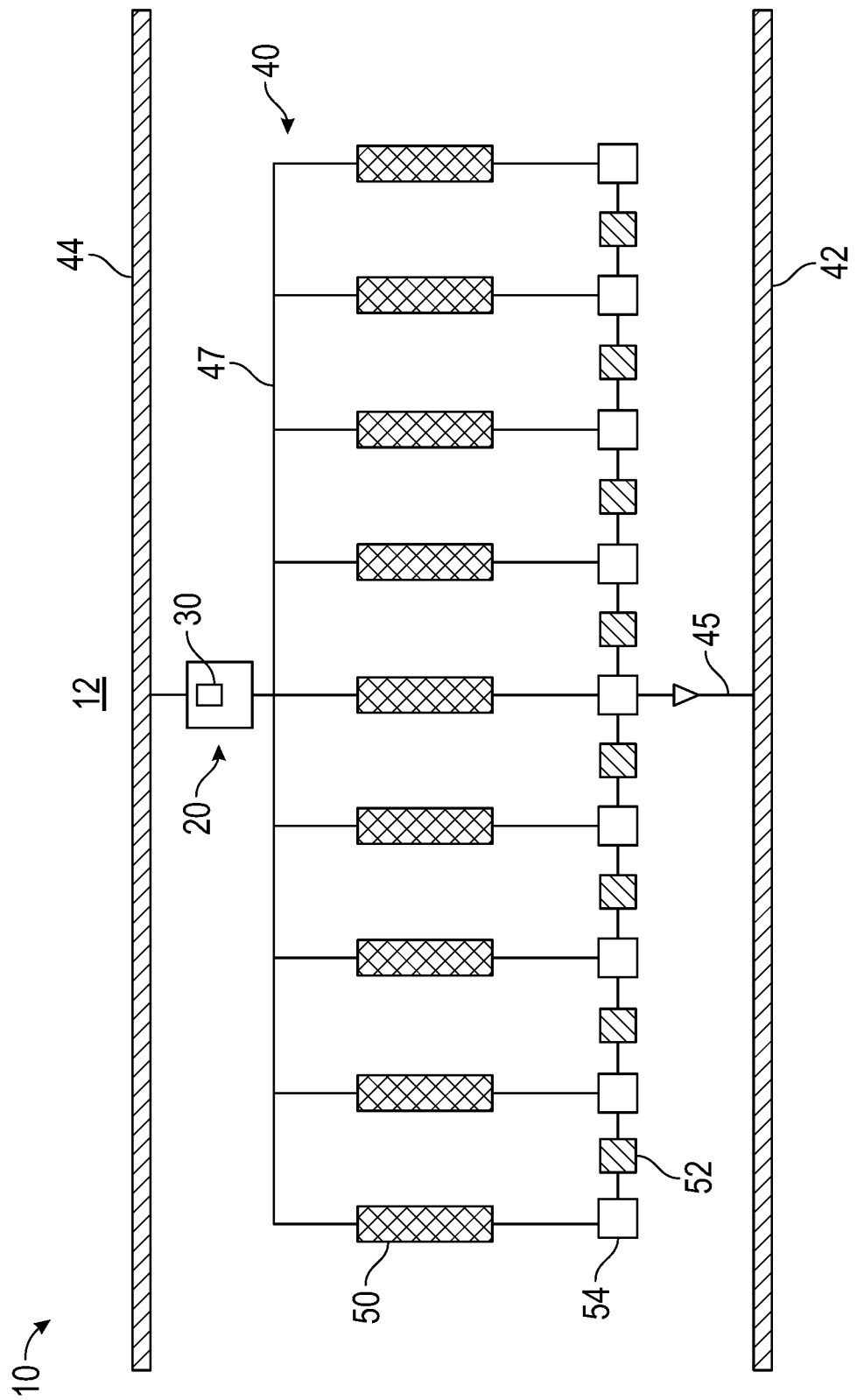
FIG. 3 illustrates a portion of an optoelectronic circuit having a tunable photonic device and a second embodiment of a trimming bank to configure trimming during fabrication.
Figure 4:
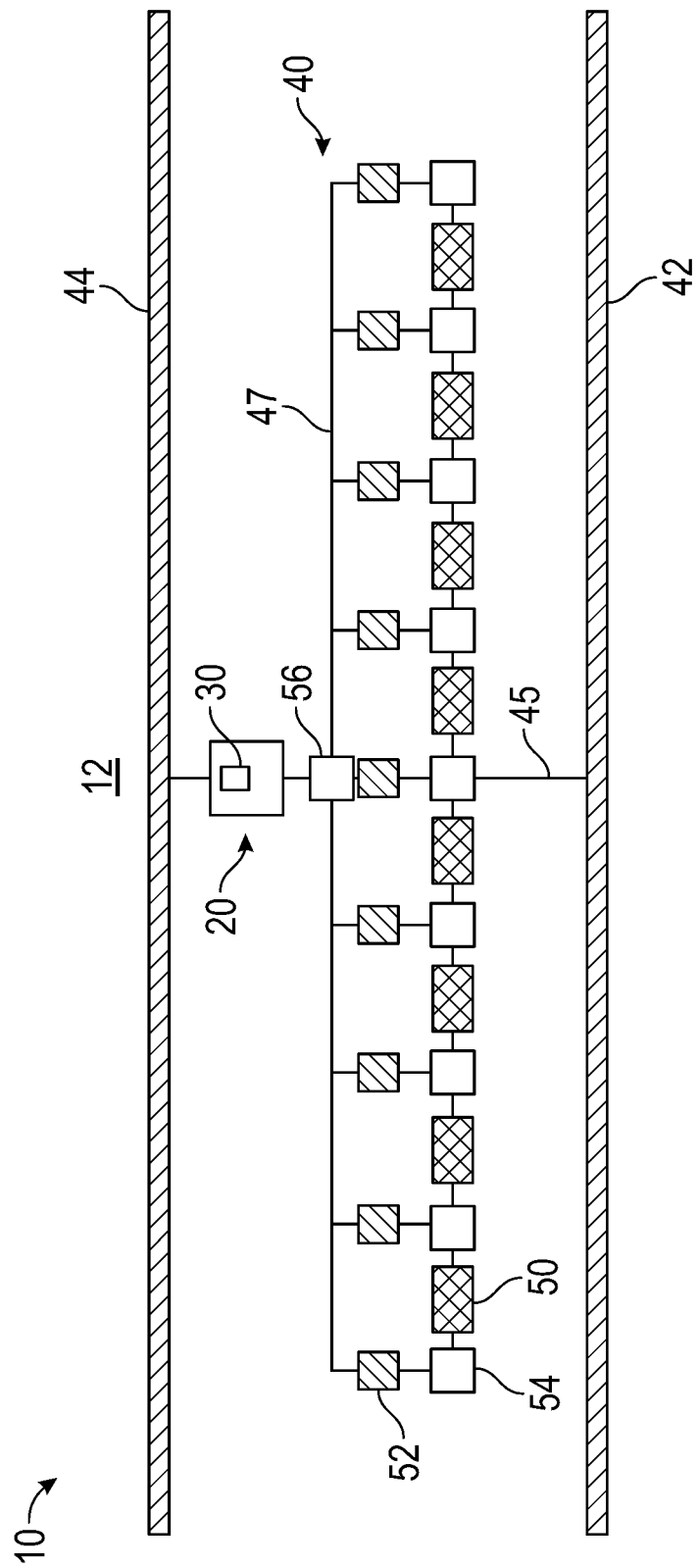
FIG. 4 illustrates a portion of an optoelectronic circuit having a tunable photonic device and a third embodiment of a trimming bank to configure trimming during fabrication.
Figure 5:
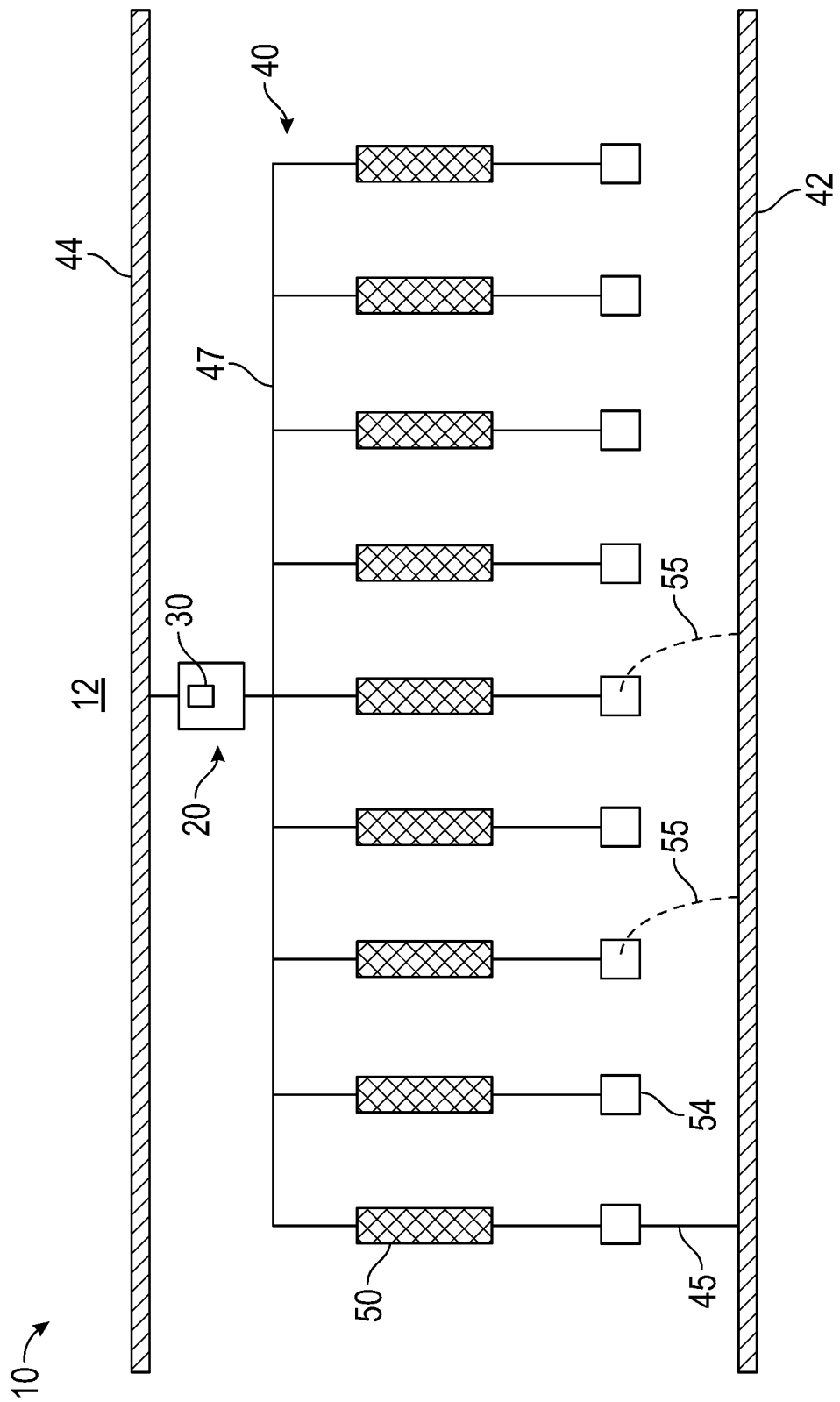
FIG. 5 illustrates a portion of an optoelectronic circuit having a tunable photonic device and a fourth embodiment of a trimming bank to configure trimming during fabrication.
Figure 6:
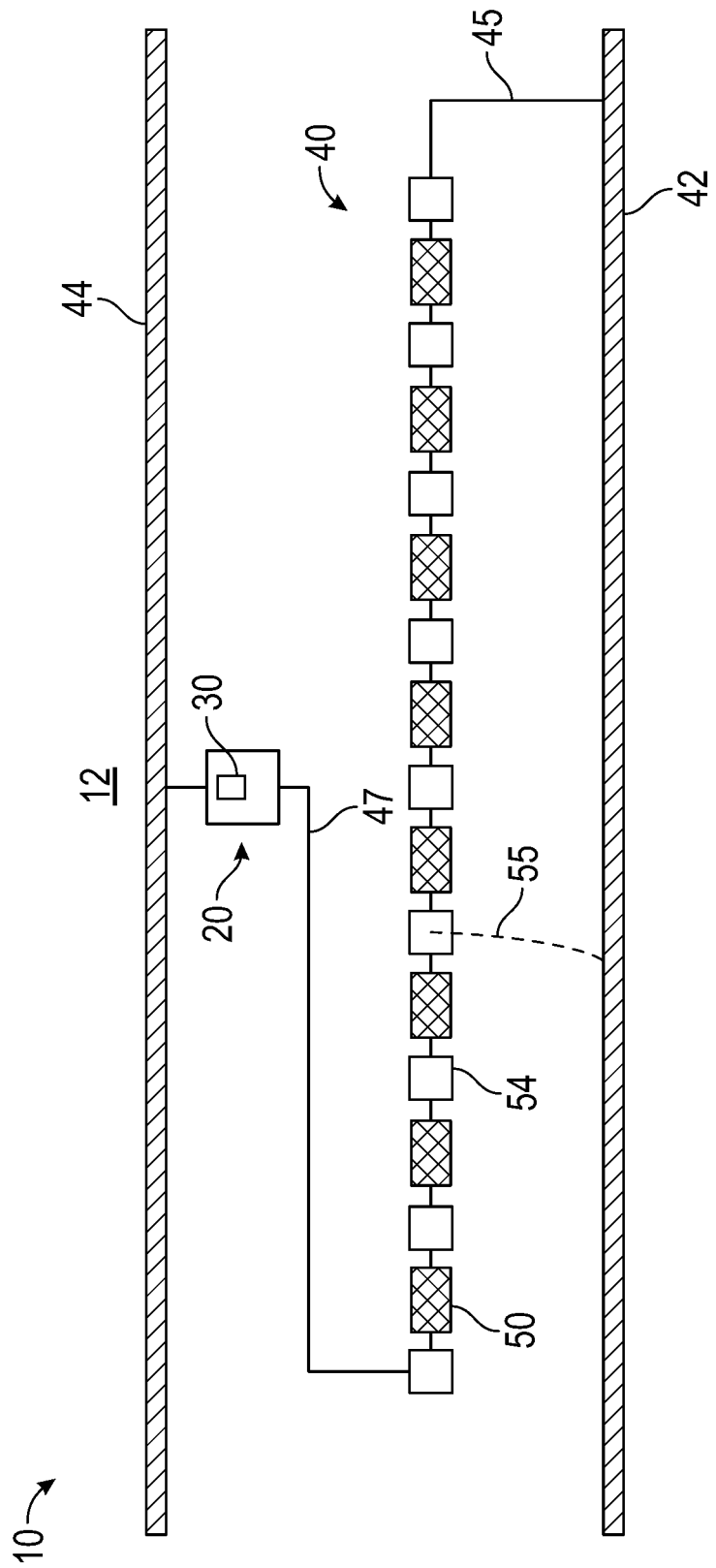
FIG. 6 illustrates a portion of an optoelectronic circuit having a tunable photonic device and a fifth embodiment of a trimming bank to configure trimming during fabrication.

FIGS. 2-6 illustrate different arrangements for a trimming bank 40 that can be used in the optoelectronic circuits 10 to provide desired trimming to the tunable photonic devices 20. In the arrangements of FIGS. 2-4, the trimming bank 40 can be resistor banks, and the resistance provided by the resistor banks 40 can be changed by burning fuses in the banks 40. In the arrangements of FIGS. 5-6, the trimming banks 40 can be resistor banks, and the resistance provided by the resistor banks 40 can be changed by wire bonding specific resistor pads to the ground bus 42.

As will be appreciated, a combination of fuse burning and wire bonding can be used together in a trimming bank 40 of the present disclosure. As will also be appreciated, although the electronic components 50 are described below as being resistors arranged in a resistor bank 40, the arrangements can be used equally well with other electronic components 50, such as capacitors, inductors, etc. and can be used with a combination of various electronic components 50.

In FIG. 2, for example, a portion of an optoelectronic circuit 10 is shown having a tunable photonic device 20, a trimming bank 40, a ground bus 42, and a power bus 44 implemented in a common platform 12. The tunable photonic device 20 and the trimming bank 40 are connected in series between the power bus 44 and the ground bus 42. The trimming bank 40 shown here is a resistor bank, including resistors 50 connected in parallel between the ground bus 42 and the tunable photonic device 20. Each connection or trace 45 of the resistors 50 to the ground bus 42 includes a fuse 52. Each connection or trace 45 between a resistor 50 and a fuse 52 is connected by a connection or trace 49 to a burning pad 56.

During fabrication, the trimmed resistance provided by the select resistor(s) 50 can be configured by burning select fuse(s) 52 in the bank 40 using a ground pad 54 and the appropriate burning pad 56. A select fuse 52 can be selectively switched from a conductive state (with the fuse intact) to a non-conductive state (with the fuse separated) in response to an overcurrent between the pads 54, 56 adjoining the select fuse 52. Other types of fuses or switches can be used.

For this parallel arrangement, the equivalent resistance is the sum of the reciprocals of the resistance values for each of the connected resistors 50. When a fuse 52 is burned, however, the reciprocal of that resistance value for the associated resistor 50 is not included in the sum for the equivalent resistance. Arrangements of resistors 50 in series can also be used, as well as combinations in both series and parallel.

In FIG. 3, a portion of an optoelectronic circuit 10 is shown having a tunable photonic device 20, a trimming bank 40, a ground bus 42, and a power bus 44 implemented in a common platform 12. The tunable photonic device 20 and the trimming bank 40 are connected in series between the power bus 44 and the ground bus 42. The trimming bank 40 is again a resistor bank and includes resistors 50 connected in parallel between ground pads 54 and the tunable photonic device 20. Each connection 45 between the ground pads 54 is connected by a fuse 52. During fabrication, the trimmed resistance provided by the select resistor(s) 50 can be configured by burning select fuse(s) 52 in the bank 40 between adjacent pads 54.

In FIG. 4, a portion of an optoelectronic circuit 10 is shown having a tunable photonic device 20, a trimming bank 40, a ground bus 42, and a power bus 44 implemented in a common platform 12. The photonic device 20 and the resistor bank 40 are connected between the power bus 44 and the ground bus 42. The resistor bank 40 includes fuses 52 connected in parallel between ground pads 54 and the photonic device 20. Each connection between ground pads 54 is connected by a resistor 50. During fabrication, the trimmed resistance provided by the select resistor(s) 50 can be configured by burning select fuse(s) 52 in the bank 40 between the adjacent pad 54 and the shared pad 56.

In FIG. 5, a portion of an optoelectronic circuit 10 is shown having a tunable photonic device 20, a trimming bank 40, a ground bus 42, and a power bus 44 implemented in a common platform 12. The photonic device 20 and trimming bank 40 are connected between the power bus 44 and the ground bus 42. The trimming bank 40 is again a resistor bank and includes resistors 50 connected in parallel between ground pads 54 and the photonic device 20. One of the ground pads 54 can be connected to the ground bus 42 by a connection 45. Each of the other ground pads 54 can be selectively connected to the ground bus 42 by wire bonding 55. During fabrication, the trimmed resistance provided by the select resistor(s) 50 can be configured by wire bonding specific resistor's ground pads 54 to the ground bus 42.

In FIG. 6, a portion of an optoelectronic circuit 10 is shown having a tunable photonic device 20, a trimming bank 40, a ground bus 42, and a power bus 44 implemented in a common platform 12. The photonic device 20 and trimming bank 40 are connected in series between the power bus 44 and the ground bus 42. The trimming bank 40 is again a resistor bank and includes resistors 50 connected in series between the ground bus 42 and the photonic device 20. The resistors 50 are connected with ground pads 54 between them, and wire bonding 55 can connect the pads 54 to the ground bus 42.

During fabrication, the trimmed resistance provided by the select resistor(s) 50 can be configured by wire bonding 55 specific pads 54 to the ground bus 42. The default resistance is the total resistance of all of the resistors 50 connected in series on the traces 45, 47. When wire bonding 55 is made as shown to one of the ground pads 52, however, the resistance will include the resistance of the resistors 50 (three in this example) between the grounded pad 54 and the photonic device 20.

As briefly mentioned above, the optoelectronic circuit 10 of the present disclosure can be used as part of an optical assembly, such as a delay interferometer-based filter, a 90-degree hybrid, a micro-ring modulator array, or the like. Some examples are discussed below.

Figure 7:
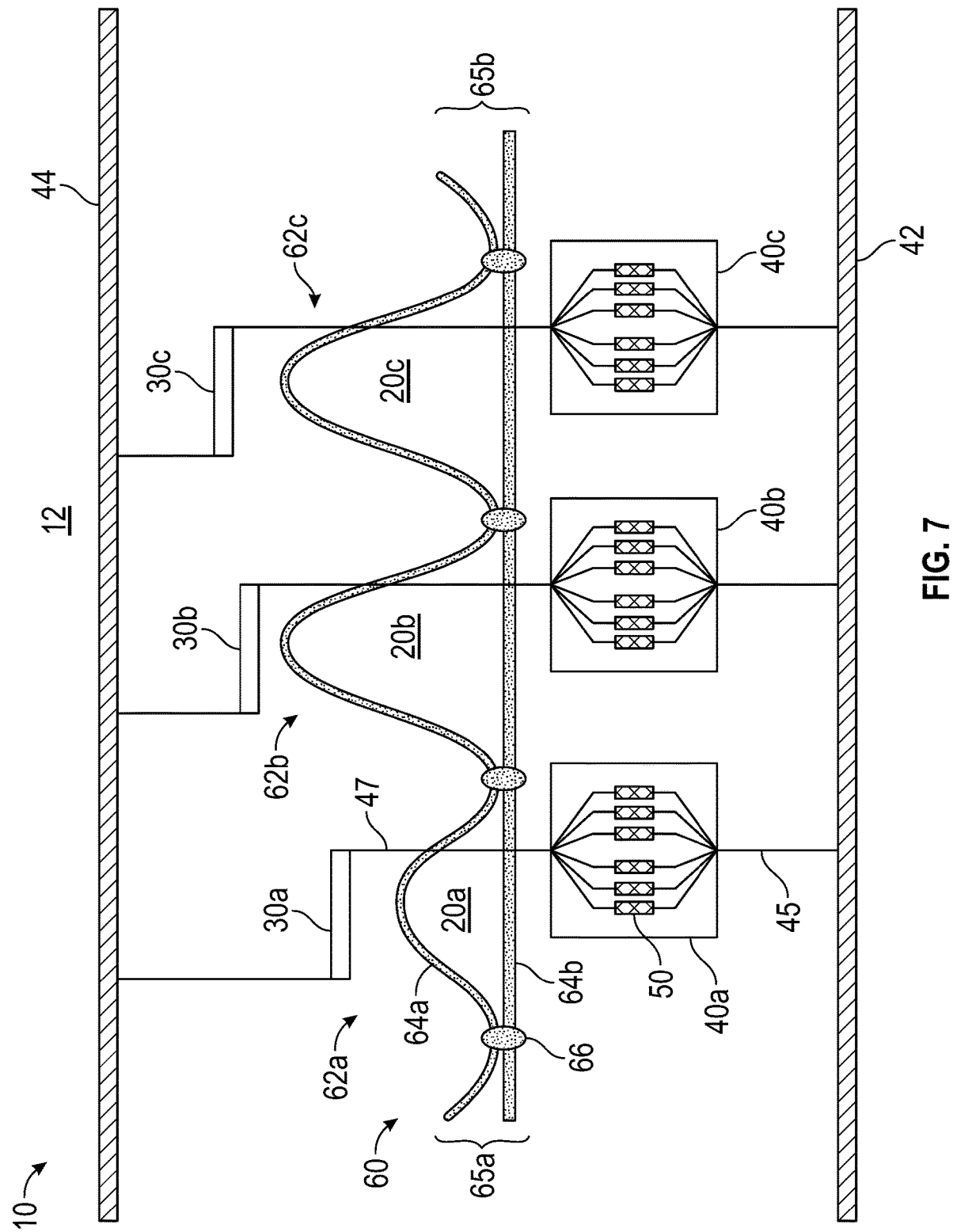
FIG. 7 illustrates a schematic view of an optoelectronic circuit of the present disclosure implemented as a delay interferometer-based filter.

For example, FIG. 7 illustrates a schematic view of an optoelectronic circuit 10 of the present disclosure implemented in a common platform 12 as a delay interferometer-based filter 60. The delay interferometer-based filter 60 includes Mach-Zehnder interferometers 62a-c cascaded in series. Each interferometer 62a-c has an upper waveguide arm 64a and a lower waveguide arm 64b connected to couplers 66. Thermo-optic phase shifters 20a-c are arranged at the upper waveguide arms 64a. Signal light is input into the optical input 65a for one of the arms 64a-b. Higher frequencies pass along the upper arms 64a in the cascaded series interferometers 62a-c, and lower frequencies pass along the lower arms 64b. Optical output can be received at the output 65b from one or both of the arms 64a-b.

The delay interferometer-based filter 60 can be designed to be fabrication insensitive or athermal. However, the initial phase characteristics of the interferometers 62a-c can be corrected with the trimming techniques disclosed herein. Each of the thermo-optic phase shifters 20a-c of the interferometers 62a-c has a resistive heater 30a-c connected in series with a resistor bank 40 between a ground bus 42 and a power bus 44. The resistance of the respective resistor bank 40 can be set by selectively configuring the resistors 50 of the resistor bank 40 using arrangements as disclosed herein so the delay interferometer-based filter 60 provides a desired output with the circuitry 60 corrected for differences in fabrication tolerances and compensated for fabrication performance that varies from target performance.

Figure 8:
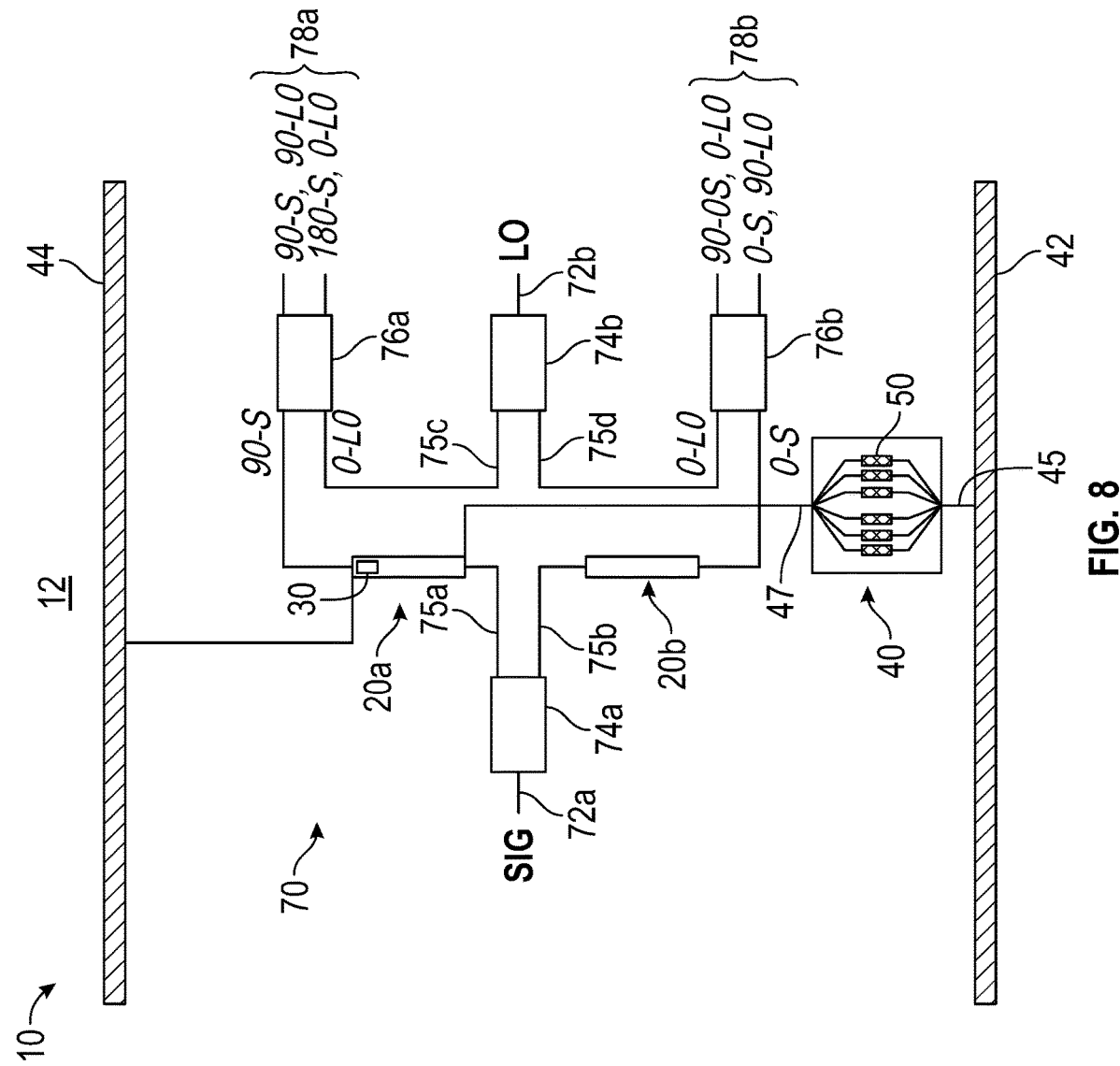
FIG. 8 illustrates a schematic view of an optoelectronic circuit of the present disclosure implemented as a 90-degree hybrid.

FIG. 8 illustrates a schematic view of an optoelectronic circuit 10 of the present disclosure implemented in a common platform 12 as a 90-degree hybrid 70. Here, the photonic devices 20A-B are thermo-optic phase shifters used in the 90-degree hybrid 70 with phase offset trimming characteristics. As is known, the 90-degree hybrid 70 acts as a 90-degree optical mixer that mixes signal light (S) with local oscillator light (LO) so quadrature phase shift keyed (QPSK) modulation can be used. The hybrid 70 is preferably implemented in a photonic integrated circuit as the common platform 12.

The hybrid 70 has four optical couplers 74*a-b* and 76*a-b*, two input ports 72*a-b*, and four output ports 78*a-d*. One input port 72*a* receives signal light "SIG", while the other input port 72*b* receives local oscillator light "LO". The optical hybrid 70 provides a mixture of the signal light (SIG) and the local oscillator (LO) light at each of the four output ports 78*a-d* with an optical phase difference incremented by 90-degrees from output to output.

Each of the inner ends of the four couplers 74*a-b*, 76*a-b* has two optical outputs interconnected with the four optical waveguides 75*a-d* in a compact arrangement. The opposing input couplers 74*a-b* respectively split the inputs 72*a-b* into two outputs. The opposing output couplers 76*a-b* each have two inputs and have two outputs. Each waveguide 78*a-d* connects one of the outputs of the input couplers 74*a-b* to the input of an adjacent output coupler 76*a-b* so that the waveguides 75*a-d* are arranged in a non-intersecting manner without waveguide crossings.

For this hybrid 70, thermo-optic phase shifters 20*a-b* are used on the waveguides 75*a-b* from the input coupler 74*a*. One of these thermo-optic phase shifters 20*a* is connected in series with a resistor bank 40 between the ground bus 42 and power bus 44. The resistors 50 in the resistor bank 40 can be trimmed during the fabrication of the optical circuit 70 so that the thermo-optic phase shifter 20*a* is set for proper phase adjustment compared to the other phase shifter 20*b*, which may or may not be connected to a resistor bank.

Figure 9:
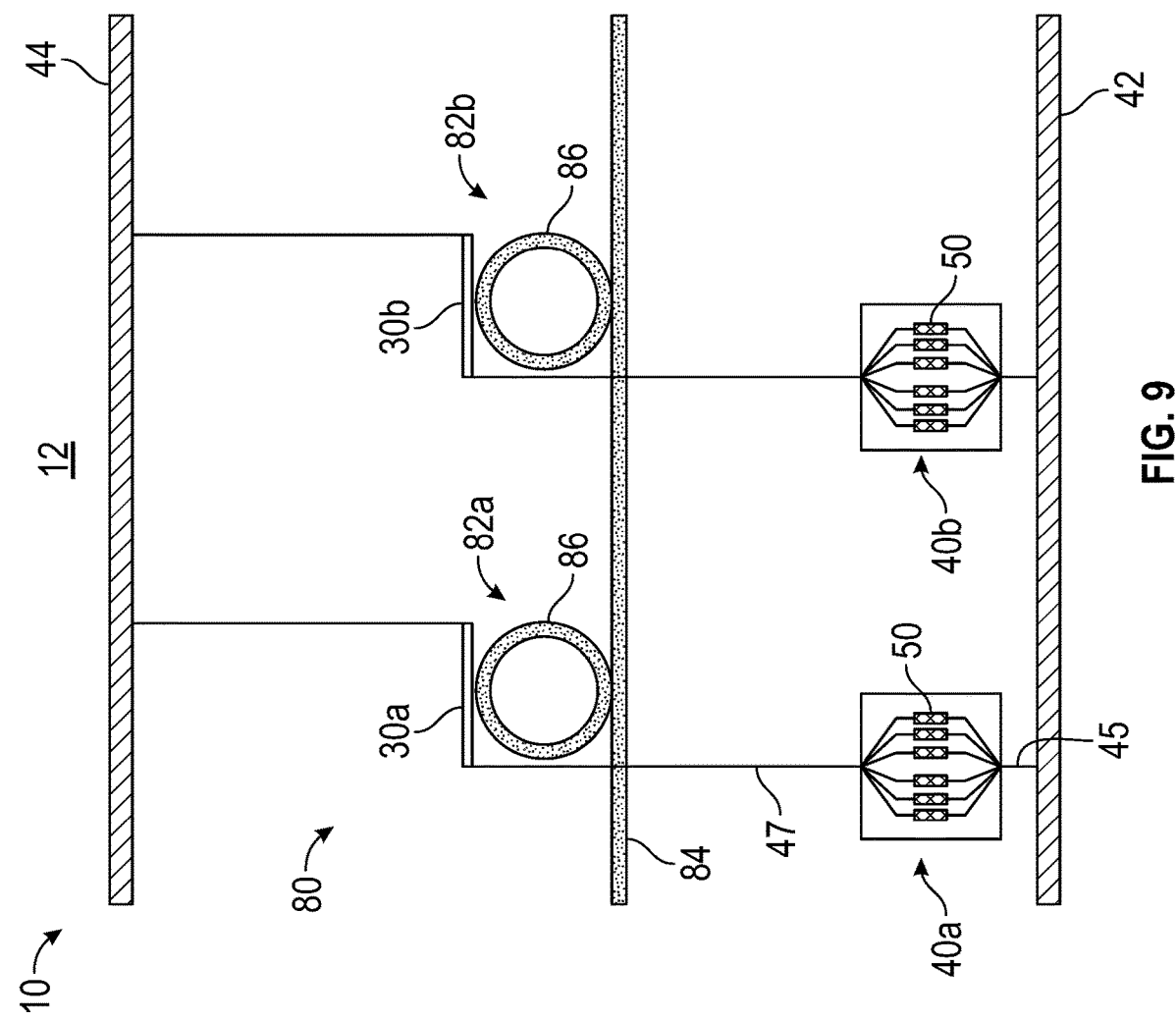
FIG. 9 illustrates a schematic view of an optoelectronic circuit of the present disclosure implemented as an array of micro-ring modulators.

FIG. 9 illustrates a schematic view of an optoelectronic circuit 10 of the present disclosure implemented in a common platform 12 as an array 80 of micro-ring modulators 82*a-b*. A bus waveguide 84 has micro-ring structures 86 of the modulators 82*a-b* optically coupled with the bus waveguide 84. The micro-ring structures 86 have modulator junctions and the like and include a resistive heater 30 as the electronically tunable element. In conventional closed-loop control, an integrated heater would tune the wavelength of micro-ring modulator 82*a-b* and would compensate for thermal drift during operation. Here, the heater 30 is trimmed for each of the micro-ring modulators 82*a-b* to diminish any variance between fabricated performance and the target performance due to the difference in fabrication tolerance in each micro-ring modulator 82*a-b* so they provide the desired modulation of the signal light.

For example, the micro-ring modulator array 80 can be designed to be fabrication insensitive or athermal. However, the initial modulation characteristics of the micro-ring modulators 82*a-b* can be corrected with the trimming techniques disclosed herein. To that end, each of the micro-ring modulators 82*a-b* has a resistive heater 30*a-b* connected in series with a resistor bank 40 between a ground bus 42 and a power bus 44. The resistance of the respective resistor bank 40 can be set by selectively configuring the resistors 50 of the resistor bank 40 using arrangements as disclosed herein so the micro-ring modulators 82*a-b* provide a desired output with the circuitry 80 corrected for differences in fabrication tolerances and compensated for fabricated performance that varies from targeted performance.

In the examples discussed previously, the electronic components 50 in each set 40 are selectively configurable to tune at least one optical characteristic of the associated tunable photonic device 20. In turn, each set 40 is independently configurable to diminish a variance between a desired target performance and an actual fabrication performance of the at least one optical characteristic for the associated tunable photonic device 20. The teachings of the present disclosure, however, can apply to other configurations in which an optoelectronic circuit is tuned to a target performance for a particular implementation, application, or the like.

The optoelectronic circuit 10 for such a configuration is similar to those described previously. The circuit 10 includes one or more tunable photonic devices 20, at least one ground bus 42, at least one power bus 44, and one or more sets or banks 40 of electronic components 50, as before. Each of these elements is disposed on a platform 12, such as a photonic integrated circuit, a substrate, a die, or a chip.

The one or more tunable photonic devices 20 are configured to condition the signal light. Each tunable photonic device 20 has at least one optical characteristic, which is electronically tunable to a target performance. The at least one ground bus 42 and the at least one power bus 44 are configured to connect to a constant supply power. Each set 40 of the electronic components 50 is disposed in electrical communication with an associated one of the one or more tunable photonic devices 20 between the buses 42, 44. The electronic components 50 in each set are selectively configurable to adjust the at least one optical characteristic of the associated tunable photonic device 20, and each set 40 is independently configurable to tune the at least one optical characteristic for the associated tunable photonic device 20 to meet the target performance.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An optoelectronic circuit used with signal light and with constant supply power, the optoelectronic circuit comprising:

one or more tunable photonic devices disposed on a platform and being configured to condition the signal light, each tunable photonic device fabricated with at least one optical characteristic being electronically tunable, a fabricated performance of the at least one optical characteristic for each tunable photonic device being variable at a variance from a target performance of the at least one optical characteristic due to a difference in fabrication tolerance;

at least one ground bus and at least one power bus disposed on the platform and being configured to connect to the constant supply power; and one or more sets of electronic components disposed on the platform, each set being disposed in electrical communication with an associated one of the one or more tunable photonic devices between the at least one ground bus and the at least one power bus, the electronic components in each set being selectively configurable to tune the at least one optical characteristic of the associated tunable photonic device, each set being independently configurable to diminish the variance between the target and fabrication performances of the at least one optical characteristic for the associated tunable photonic device wherein each of the one or more sets of electronic components comprises a bank of the electronic components disposed in parallel on electrical traces between the at least one ground bus and the associated tunable photonic device, each of the electrical traces having a fuse, each of the fuses being selectively configurable between a conductive state and a non-conductive state.

2. The optoelectronic circuit of claim 1, wherein the platform comprises a photonic integrated circuit, a substrate, a die, or a chip.

3. The optoelectronic circuit of claim 1, wherein the optoelectronic circuit comprises a delay interferometer-based filter; wherein the one or more tunable photonic devices comprise thermo-optic phase shifters having resistive heaters; and wherein the electronic components comprise resistors.

4. The optoelectronic circuit of claim 1, wherein the optoelectronic circuit comprises a 90-degree hybrid; wherein the one or more tunable photonic devices comprise thermo-optic phase shifters having resistive heaters; and wherein the electronic components comprise resistors.

5. The optoelectronic circuit of claim 1, wherein the optoelectronic circuit comprises a micro-ring modulator array; wherein the one or more tunable photonic devices comprise micro-ring modulators optically coupled to a bus waveguide and having resistive heaters; and wherein the electronic components comprise resistors.

6. The optoelectronic circuit of claim 1, wherein the one or more tunable photonic devices comprise an optical filter, a thermo-optic phase shifter, a micro-ring device, a ring resonator, a ring modulator, a multiplexer filter, a demultiplexer filter, a Mach-Zehnder interferometer, a Mach-Zehnder modulator (MZM) array, and an electro-absorption modulator.

7. The optoelectronic circuit of claim 1, wherein the one or more tunable photonic devices comprise a tuning element configured to tune the at least one optical characteristic, the tuning element having a thermo-optic mechanism, an electro-optic mechanism, or a magneto-optic mechanism responsive to voltage or current.

8. The optoelectronic circuit of claim 1, wherein the electronic components comprise resistors, capacitors, inductors, or a combination thereof.

9. The optoelectronic circuit of claim 1, wherein the bank comprises a first pad connected between the electrical traces and the at least one ground bus; wherein each of the electrical traces comprises a second pad disposed between the fuse and the electronic component associated therewith; and wherein each of the fuses is selectively configurable from the conductive state to the non-conductive state on the associated electrical trace in response to an overcurrent between the first pad and the associated second pad.

10. The optoelectronic circuit of claim 1, wherein the bank comprises a plurality of pads connected between the fuses; and wherein each of the fuses is selectively configurable from the conductive state to the non-conductive state on the associated electrical trace in response to an overcurrent between the pads connected therebetween.

11. The optoelectronic circuit of claim 1, wherein each of the electrical traces comprises a first pad disposed between the fuse and the electronic component associated therewith; wherein the bank comprises a second pad connected between the fuses and the associated tunable photonic device; and wherein each of the fuses is selectively configurable from the conductive state to the non-conductive state on the associated electrical trace in response to an overcurrent between the associated first pad and the second pad.

12. The optoelectronic circuit of claim 1, comprising:
a plurality of the one or more tunable photonic devices disposed on the platform; and
a plurality of the one or more sets of electronic components disposed on the platform and each associated with one of the tunable photonic devices.

13. The optoelectronic circuit of claim 12, wherein each set is independently configurable to diminish the variance due to the difference in the fabrication tolerances between two or more of the tunable photonic devices.

* * * * *